Feb. 17, 1953  J. H. POWERS  2,628,871
TANDEM BEARING ASSEMBLY AND LUBRICATION THEREOF
Filed April 1, 1949
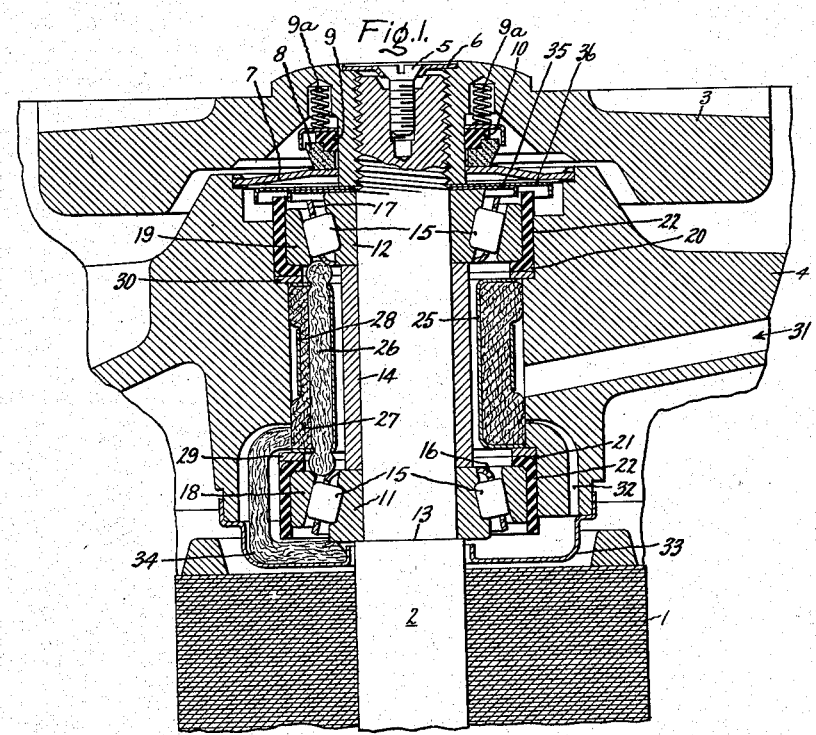
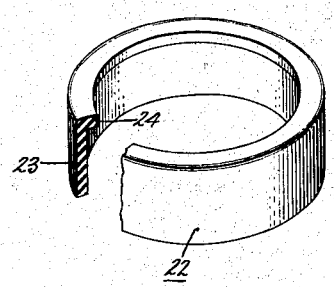
Inventor:
James H. Powers,
by Sheridan... 
His Attorney.

Patented Feb. 17, 1953

2,628,871

UNITED STATES PATENT OFFICE 2,628,871

TANDEM BEARING ASSEMBLY AND LUBRICATION THEREOF

James H. Powers, Westport, Conn., assignor to General Electric Company, a corporation of New York Application April 1, 1949, Serial No. 84,954

1 Claim. (Cl. 308—184)

This invention relates to an improved anti-friction bearing assembly for supporting a rotating shaft, and to an improved construction for lubricating the bearing.

The illustrated embodiment described herein is directed particularly to waste disposal apparatus of the type which comminutes material, thoroughly mixes the comminuted material with a generous supply of water, and discharges the resultant fluid mixture into the drain or sewer. It should be understood, nevertheless, that this invention is not limited solely to waste disposal apparatus since the bearing assembly construction disclosed herein may find numerous other applications.

It is a primary object of my invention to provide a new and improved anti-friction bearing assembly for a rotating shaft extending through a fixed member and carrying both axial and lateral shaft loads, which is economical in first cost, readily assembled and self-adjusting over an increased range of manufacturing tolerances, while employing standard anti-friction bearings readily available on the market.

It is a further object of my invention to provide a more economically manufactured bearing assembly by permitting increased tolerances in the manufacture of the various components making up the assembly.

A still further object is to provide an assembly utilizing a pair of standard bearings at spaced points on the shaft, arranged to share the bearing load equally and to reduce the noise level from shaft and bearing vibration to a minimum.

Still another object of my invention is in the provision of an improved arrangement for lubrication of the moving parts of each bearing.

In achievement of the foregoing objectives, a feature of my invention consists in supporting a rotating shaft extending through a fixed support by a pair of spaced apart anti-friction bearings, each bearing including a bearing cone affixed to the shaft and an outer race receivable in a well provided in the supporting member with a resilient liner between each race and the walls of its well. Another feature of my invention is in the employment of a spool carrying lubricant-absorbing material and a wick with the spool encircling the shaft in the space between the bearings. The wick extends beyond the ends of the spool to conduct lubricant to the bearings.

The features of my invention which I believe to be novel are set forth with particularity in the appended claim. My invention itself, however, both as to its organization and method of operation, together with further objects and advantages thereof, may best be understood by reference to the following description taken in connection with the following drawings, in which Fig. 1 is a front elevation in section of a portion of a waste disposal apparatus having this new and improved bearing assembly; and Fig. 2 is a sectionalized perspective view of a resilient ring employed in this bearing assembly.

The bearing assembly, in accordance with my invention, is illustrated as applied to waste disposal apparatus of the type indicated in my Patent No. 2,322,058, issued June 15, 1943 and assigned to the assignee of the present invention. Only such parts of this apparatus are shown here as are necessary for a clear understanding of this invention, other portions of the apparatus, such as the comminuting chamber, shredding members, etc., being omitted from this disclosure for the purpose of clarity and to avoid confusion.

Referring to Fig. 1, the waste disposal apparatus is normally driven by an electric motor having a rotor 1 driving shaft 2. Shaft 2 has affixed to its end away from the rotor a flywheel 3 carrying suitable impeller blades, not shown, to whirl the waste material within the comminuting chamber of the waste disposal apparatus in order to reduce such waste material to a flowable mass. Shaft 2 is rotatably mounted in bottom flange 4 of the waste disposal apparatus, and bottom flange 4 for the purposes of this disclosure will be referred to as the shaft supporting member.

The upper end of shaft 2 is threaded to receive the mating central aperture in flywheel 3. By the addition of the screw threaded member 5 and washer 6, flywheel 3 is rigidly affixed to shaft 2. The flywheel 3 therefore constitutes a driven member non-rotatably associated with shaft 2.

It is important to prevent the passage of water or waste material into the bearing assembly. For this reason means are provided for sealing the space around the rotating flywheel from the bore extending through supporting member 4. A sealing washer 7 extends over the upper opening of the shaft and bearing receiving bore in supporting member 4. Sealing washer 7 is centrally apertured to receive the hub of flywheel 3. An annular sealing ring 8 of wear-resisting material rides on sealing washer 7 and a resilient ring 9 aids in maintaining the sealing ring 8 in firm contact with washer 7 at all times. As a further aid in forcing sealing ring 8 into contact with washer 7, a series of coiled springs 9a are placed in prepared apertures in flywheel 3 exerting their pressure against washer 10, thus transmitting the force of the springs to the resilient ring 9 and the sealing ring 8.

In the construction of disposal apparatus, it has been found most convenient to mount the driving motor underneath the comminuting chamber with the motor shaft in a vertical position. Such a construction necessitates a bearing assembly capable of supporting the vertical thrust load. Furthermore, with such an arrangement, it is preferable to eliminate the conventional upper end bell and bearing structure for the motor and combine the bearing for the flywheel and the upper motor bearing into a unitary bearing assembly. In accordance with this construction, a pair of tapered anti-friction bearings are employed, the lower bearing having a bearing cone 11 and the upper bearing having a bearing cone 12. In assembly, the lower bearing cone 11 is forced onto shaft 2 into abutting relation with a shoulder 13. The presence of shoulder 13 accurately positions the lower bearing cone. The position of upper bearing cone 12 is accurately controlled by the use of a cylindrical spacer 14 encircling shaft 2 and resting on the upper surface of lower bearing cone 11. Each bearing cone makes a press fit with shaft 2 so that once these cones have been properly positioned, no additional attaching or retaining means are necessary.

Each bearing includes a plurality of anti-friction elements retained in a cage, and an outer race. The anti-friction elements are here shown as rollers 15, although it will be appreciated that balls might also be used for this purpose. The roller or anti-friction elements of the lower bearing are retained in a cage 16, and similarly, the anti-friction elements of the upper bearing are retained in cage 17. Each bearing has an outer race, the race for the lower bearing being designated as 18 and the corresponding race for the upper bearing being designated 19. It will be understood that a specially manufactured bearing is not required for this installation, commercially available conically tapered bearings being suitable.

The supporting member 4, in addition to having a centrally located bore for reception of shaft 2, also has a concentrically located bearing well 20 at the upper end and a similar concentrically located bearing well 21 at the bottom. A resilient annular ring with an inturned flange around one edge thereof is employed for lining each of the bearing wells. This ring 22, as best shown by Fig. 2, has side wall 23 and inturned flange 24. I have found that neoprene is a satisfactory material for this ring, although any other suitable resilient plastic material may be employed. However, since this ring is intimately associated with the bearing, it must be resistant to oils or other lubricants in addition to being resilient. One of the rings 22 is installed in the lower bearing well 21 with its inturned flange 24 at its upper end. Thus, the resilient ring 22 lines the bearing well so that when the outer race 18 of the lower bearing is placed in position, it will be supported entirely out of direct contact with the supporting member 4. The ring 22 for the upper bearing is installed with its inturned flange 24 extending around its lower end. Therefore, the race 19 of the upper bearing is also positioned within the bearing well and is supported out of contact with supporting member 4. When the assembly is completed, both wall 23 and flange 24 of both rings 22 are under slight deformation by compression. This assures tightness of the bearings proper, since a slight but evenly distributed lateral load is placed on the bearings at all times.

It is desirable in the construction of disposal apparatus to mount the flywheel 3 so that it may freely rotate, but with the possibility of vertical displacement or end play substantially eliminated. By employing tapered anti-friction bearings, with the direction of taper of the lower bearing being toward the shaft axis above the lower bearing and with the direction of taper of the upper bearing directed toward the axis of the shaft below the upper bearing, the possibility of end play is substantially eliminated.

The annular resilient rings 22 serve several purposes. Firstly, the manufacturing tolerances of the components of this assembly may be safely increased since the resulting dimensional variations can be taken up by the inherent resiliency of annular rings 22. Furthermore, the transmission of vibration and noise from shaft 2 and the bearings to supporting member 4 are minimized. A further important objective accomplished by the use of these resilient annular rings is to cause each bearing to assume its share of the bearing thrust load. Thus, in a completed assembly, if one of the bearings tends to assume more than its proportionate share of the load, the inturned flange 24 of the annular ring will be compressed. This compression results in a slight shifting of the position of that bearing to relieve it of a share of the load and place that portion of the load on the other bearing. The net result is that each bearing tends to assume one-half of the load.

Lubrication of the moving parts of the bearings, in accordance with my invention, is accomplished by use of a lubricant reservoir and wick. The lubricant reservoir preferably takes the form of a spool 25 encircling shaft 2 and spacer 14. A lubricant conducting wick 26 is positioned on the spool with its end portions wiping respectively on the bearing cages of the upper and lower bearings. Lubricant absorbing and retaining material 27, such as sliver wool, is wrapped around spool 25 and over wick 26. A spring clip or band 28 may be employed to maintain the sliver wool and wick 26 in position. Lubricant spool 25 is positioned between the bearings and it rests at its lower end on a washer 29 positioned within the lower bearing receiving well 21. A similar spool retaining washer 30 is placed in the upper bearing receiving well.

The supporting member 4 is provided with a lubricant receiving passage 31 into which a quantity of lubricant may be injected. Most of the lubricant which is thus supplied will be absorbed by the sliver wool 27. However, any excess lubricant which cannot be retained by the sliver wool 27 may drain off through a passage 32 in supporting member 4 and into a lubricant retaining cup 33 attached at the bottom end of supporting member 4. A wick 34 extends from the bottom of this lubricant retaining cup up to the lubricant absorbing and retaining material 27. This arrangement thus provides a sizable capacity for lubricating material and reduces the required frequency of lubrication.

It will be noted that the conical bearings employed in this assembly slope outwardly from their inner face, that is, from the lower face of the upper bearing and from the upper face of the lower bearing. While these bearings could be mounted in a reversed position, I find the arrangement shown to be preferable since the lubricant conducted to the bearing cage, which likewise slopes outwardly, will be thrown outwardly by the centrifugal force during operation. A supply of lubricant is thus made available to all parts of each bearing. Overlying the upper bearing, I have provided a pair of lubricant deflecting washers 35 and 36. These two washers cooperate with the upper end of the resilient annular member 22 to prevent lubricants thrown upwardly and outwardly by the upper bearing from leaking out of the assembly.

By the above construction, it will be seen that I have provided an improved bearing assembly for rotatably supporting a shaft carrying on one end a driving member and on the other end a driven member. The cost of manufacture of this assembly is minimized by permitting increased tolerances through the use of the resilient rings or liners for the bearing receiving wells. Also, objectionable noise has been reduced due to the vibration absorbing characteristics of the mounting for each bearing within its supporting member. Furthermore, this assembly gives longer wear and more satisfactory service since each bearing carries its proportionate share of the bearing load, and provision has been made for continuous lubrication of the moving parts. Furthermore, the driven member is rotatably mounted with respect to a support in such a manner as will permit free rotation while reducing to a minimum lateral and longitudinal displacement; this condition will be preserved throughout the life of the apparatus in view of the characteristic of the bearing mountings to take up slight dimensional variations resulting from wear.

While the present invention has been described by reference to particular embodiments thereof, it will be understood that numerous modifications may be made by those skilled in the art without actually departing from the invention. I, therefore, aim in the appended claim to cover all such equivalent variations as come within the true spirit and scope of the foregoing disclosure.

What I claim as new and desire to secure by Letters Patent of the United States is:

A bearing assembly for a rotatable shaft comprising a supporting member with a bore having a substantially vertical axis provided therein for receiving said shaft, bearing receiving wells in said supporting member at the upper and lower ends respectively of said bore, a resilient member lining each of said wells, a pair of separate tapered antifriction bearings having respective outer races positioned in each of said wells, bearing cones fixed at spaced points on said shafts in alignment with said races, a tubular spacer sleeve on said shaft between said bearing cones, antifriction means positioned between each race and its corresponding cone, a spool in said supporting member bore loosely encircling said shaft and spacer member between said bearings, said spool including lubricant absorbing material and a wick for conducting lubricant to said bearings, and lubricant deflecting and retaining means above said upper bearing, said means including a portion of the resilient member for said upper well.

JAMES H. POWERS.

REFERENCES CITED

The following references are of record in the file of this patent:

UNITED STATES PATENTS

| Number | Name | Date |
| --- | --- | --- |
| 1,676,894 | Frank | July 10, 1928 |
| 1,851,561 | Baninger | Mar. 29, 1932 |
| 1,886,395 | Graul | Nov. 8, 1932 |
| 2,015,784 | Brown | Oct. 1, 1935 |
| 2,017,290 | Parker | Oct. 15, 1935 |
| 2,149,122 | McCall | Feb. 28, 1939 |
| 2,282,883 | Powers | May 12, 1942 |
| 2,284,446 | Powers | May 26, 1942 |

FOREIGN PATENTS

| Number | Country | Date |
| --- | --- | --- |
| 496,282 | Great Britain | Feb. 22, 1937 |